May 27, 1958     B. S. NEWELL     2,836,274
SPEED LIMITING COUPLING DEVICE
Filed July 19, 1955
FIG.1.
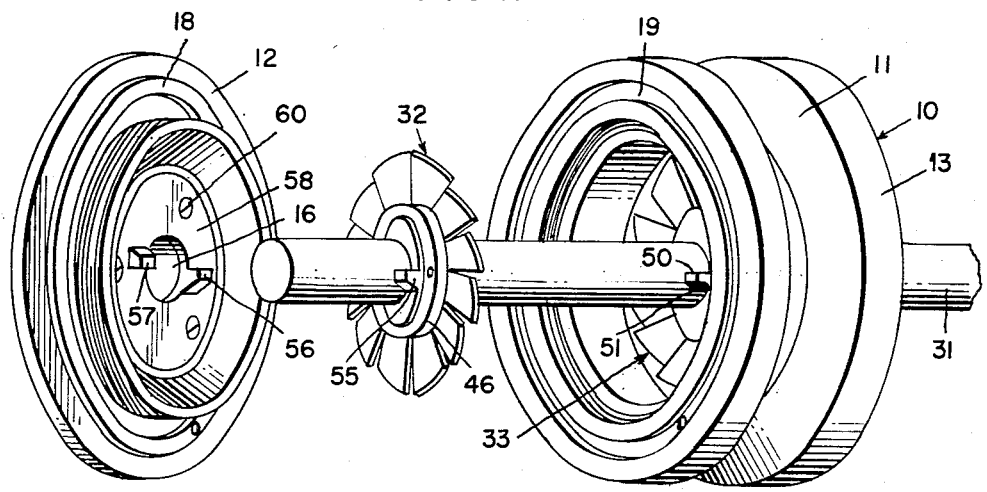
FIG.3.
FIG.2.
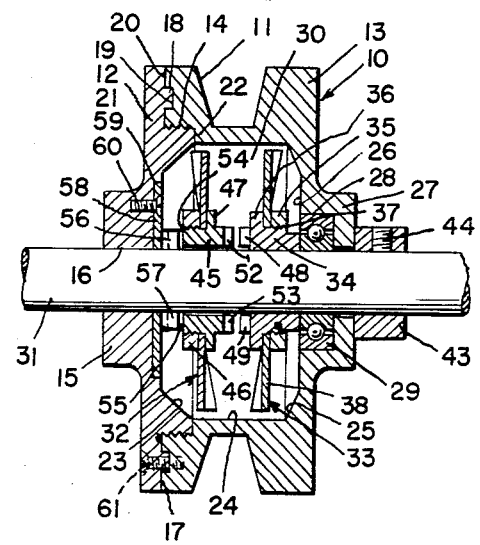
FIG.4.
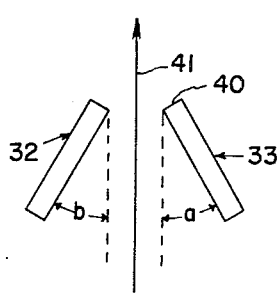
INVENTOR.
Blake S Newell
BY
Shoemaker & Mattare
ATTYS.

United States Patent Office 2,836,274
Patented May 27, 1958

2,836,274

SPEED LIMITING COUPLING DEVICE

Blake S. Newell, Washington, D. C.

Application July 19, 1955, Serial No. 522,945

10 Claims. (Cl. 192—104)

This invention relates to a fluid actuated coupling device and pertains more particularly to a device of that character which is capable of limiting the rotational drive speed imparted between one member and another.

One important use for the present invention is to provide a means for driving an automotive generator, particularly the automotive generator of taxi cabs or vehicles which are operated at low speeds for great lengths of time. Taxi cabs, for example, often find that during the normal course of operation the generator is not rotated at a speed sufficiently high to assure that the battery will be maintained at the optimum charge, and in fact battery failure is quite common. To offset this, it is common practice to replace the pulley which drives the generator with one of smaller diameter so that even at idle speed the generator will be driven at a sufficiently high speed of rotation as to assure proper charging of the battery. This, however, has an extremely detrimental effect when the vehicle is driven at higher speeds, say above 30 or 35 miles per hour, inasmuch as in order to get a proper charging rate from the generator at the usual speeds the taxi cab encounters, the speed of the generator relative to the motor must be so great that at higher speeds the generator is rotated too fast, with consequent destruction of the generator after very short periods of time.

It is, therefore, a primary object of this invention to provide a drive device suitable for use, for example, in driving a taxi cab generator which will limit the maximum at which the generator can be driven.

It is another object of this invention to provide a device in accordance with the preceding object wherein the same is of very compact form and is entirely automatic.

A still further object of this invention is to provide a pulley and shaft device interconnected by an hydraulic coupling device such that the pulley and shaft will be coupled together below a predetermined speed but will be automatically disconnected or uncoupled at speeds higher than such speed, and wherein such uncoupling takes place automatically and also wherein the device will be reconnected as the speed falls below the stated predetermined upper limit.

Another object of this invention is to provide a pulley body constructed of two separable parts which have a fluid chamber therebetween and through which a shaft is projected and wherein coupling means are provided within such chamber to effect the automatic drive between the pulley and the shaft.

Still another object of this invention is to provide an hydraulic coupling between a driven and a driving member wherein one or the other of the members is provided with a fluid chamber and wherein a pair of impeller members are disposed within the chamber, one being connected to the driven member and the other being freely journaled on the driven member and movable toward and away from the first mentioned impeller member between a position coupling the same for rotation with the driving member only and a position interconnecting the driving member with the first mentioned impeller member so as to complete a positive drive between the driving and driven members.

Another object of this invention is to provide a fluid coupling device including a driving member having a fluid chamber therein and a driven member rotatably journaled with respect to the driving member and projecting concentrically through such chamber, there being a fixed impeller member secured to the driven member and including an even number of twisted blade elements having common angles of inclination which is so disposed as to provide a leading edge for each impeller which is most closely adjacent a second impeller member which is journaled on the driven member and which second impeller member includes an odd number of twisted blade elements which have common angles of inclination and which blade elements have leading edges which are disposed adjacent the first impeller member, the second impeller member being movable longitudinally along the driven member toward and away from the first impeller member and constantly in connection with the driving member so as to physically couple and uncouple the first and second impellers.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is an exploded perspective view of a pulley member constructed in accordance with this invention;

Fig. 2 is a longitudinal section taken through the device shown in Fig. 1 showing the same in assembled position and with the impeller elements disposed in that position occurring at speeds above the upper limit;

Fig. 3 is a plan view of one of the impeller elements; and

Fig. 4 is a diagrammatic view showing the relation of the angulated impeller blades with respect to the direction of rotation.

Referring now more particularly to Figs. 1 and 2, reference numeral 10 indicates generally a pulley member of circular form having a circumferential groove 11 therein adapted to receive a V-belt or the like whereby the pulley member will be rotated by some mechanism such as from the crank shaft pulley of an automotive engine. The pulley proper comprises essentially two component parts 12 and 13, which are threadedly engaged together as indicated by the reference character 14. The part 12 includes a hub portion 15 having a central aperture 16 therethrough and on the inner face 17 of this part is an annular shoulder 18 which projects into a corresponding annular groove 19 in the adjacent face 20 of the pulley part 13. Disposed concentrically with the annular shoulder 18 is a smaller diameter shoulder portion 21 whose outermost face is provided with screw threads for the purpose of establishing the previously mentioned connection 14. It will be noted that the pulley part 13 is provided with a stepped portion 22 having its face portion which corresponds with the shoulder 21 threaded for interengagement therewith and, as seen, the parts are so machined as to provide a very tight fit where the pulley parts are disposed in face to face relation.

The inner face of the shoulder portion 21 is beveled as at 23 and such bevel intersects a cylindrical bore portion 24 of the pulley part 13 whose opposite end is beveled in the region designated by the reference character 25 and terminates in a straight face 26 as shown in Fig. 2. The part 13 also includes a hub 27 having a counter bore 28 therein for the reception of a ball bearing member 29. By the construction of the inner surfaces of the pulley parts 12 and 13 a fluid chamber 30 is formed therebetween and in operation of the device this chamber is completely filled with a fluid such as light oil or the like.

In the particular construction shown in the drawings, the pulley member is the driving member and the shaft 31 which projects axially through the pulley and the chamber 30 is the driven member. The shaft 31 is journaled in the hub 27 of the pulley part 13 by means of the ball bearing 29 and is journaled also in the hub portion 15 of the pulley part 12 so that the pulley member 10 is freely journaled on such shaft. Disposed within the fluid chamber 30 are a pair of impeller members 32 and 33. The impeller member 33 is feathered or otherwise non-rotatably secured to the shaft 31 whereas the other impeller member 32 is freely rotatable thereon. Impeller 33 includes a hub or boss portion 34 which is externally threaded as at 37 and which includes a radial stop shoulder portion 36. On the threaded portion 35 is received a nut member 35 which clamps a blade ring 38 between such nut and the stop shoulder 36 such that the blade ring is rigid with the hub 34.

As shown in Fig. 3, the blade ring 38 has its outer periphery divided into a series of impeller blades 39. Each of the impeller blades is twisted with respect to the plane of the central portion of the impeller blade assembly and the angle of twist or inclination as indicated by the reference character *a* in Fig. 4 is the same for all blades, and the direction of twist is such as to present a leading edge 40 on each blade which is disposed most closely adjacent the other impeller assembly 32, the direction of rotation being indicated by the arrow 41. Conveniently, the blades may be formed by slitting the impeller disk as indicated by the reference character 42 whereby the twisting operation of the individual blades can be easily performed.

The hub 34 of the impeller assembly 33, as will be seen most clearly in Fig. 2, abuts snugly against the inner race of the ball bearing 29 and on the outside of the hub 27 is provided a locating ring 43 which is secured to the shaft 31 as by a set screw 44, the hub 34 and the ring 43 coacting to prevent longitudinal shifting of the pulley member along the shaft 31.

The impeller member 32 is constructed generally along the lines of the impeller 33 in that it includes a hub portion 45, a retaining nut 46 and a stop shoulder 47 as well as the impeller blade ring proper. However, the number of impeller blades in the assembly 32 is different from the number of blades in the impeller assembly 33, that is, there is an odd number of blades in the impeller assembly 32, preferably one more than the number of blades on the impeller assemly 33.

The hub 34 of the impeller assembly 33 has on that face adjacent to the impeller 32 a pair of lugs 48 and 49 which are diametrically opposed to each other and which are so formed as will be seen in Fig. 3 as to present on one side flat stop faces 50 and on the other side inclined cam faces 51. A similar pair of lugs 52 and 53 are formed on the adjacent face of the hub 45 of the other impeller 32 so that it will be seen that when such lugs are interengaged, the impellers will rotate as a unit. The opposite end face of the hub 45 also has provided thereon a similar pair of lugs 54 and 55 which are engaged with another pair of similar lugs 56 and 57 which are rigid with the pulley member 10. These latter lugs 56 and 57 are formed on the inner face of an annular plate member 58 which is disposed within a counter bore 59 of the pulley part 12, rigid connection being had therebetween as by means of a series of screw members 60. In like manner, the pulley parts 12 and 13 may be secured together by one or more screw members 61 and it is preferred that their threaded connection 14 be such as to be self-tightening due to the direction of rotation of the pulley and shaft.

In the operation of the device, as previously stated, the chamber 30 is completely filled with hydraulic or similar fluid and the impeller members will be seen to be so constructed that they may move between the position shown in Fig. 2 wherein when the pulley 10 is rotated no drive will be transmitted to the shaft due to the fact that the various lugs 48, 49, 52 and 53 are out of engagement, and a position wherein such lugs 48, 49, 52 and 53 are interengaged while at the same time the lugs 54, 55, 56 and 57 are engaged, thus transmitting the drive between the pulley and the shaft 31. This can be accomplished since the impeller assembly 32 is longitudinally movable along the shaft 31 and it will be noted that the movement permitted of such impeller assembly is such that the lugs 54—57 will always be engaged, the coupling effect being attained by the engagement and disengagement of the lugs 48, 49 with the lugs 52, 53.

At low speeds, that is below the upper limit, regardless of the initial position of the impeller assembly 32, such impeller member will shift along the shaft 31 and engage with the impeller 33 to couple the pulley to the shaft, this action occurring as soon as rotation is imparted to the pulley. As soon as the pulley is rotated above the upper limit of speed for the shaft 31, the impeller 32 will be shifted longitudinally along the shaft 31 to the position shown in Fig. 2 wherein the impellers 32 and 33 are out of engagement and consequently the drive from the pulley to the shaft is discontinued. As soon as the speed drops below the upper limit for the shaft 31, the impeller 32 will move back into engagement with the impeller 33 and recouple the shaft with the pulley, although this latter effect does not occur until some speed substantially below the aforesaid upper limit speed.

One specific embodiment of this device was constructed in accordance with the following dimensions: The inside diameter of the cylindrical wall portion 24 defining in part the chamber 30 was approximately 2⅛ inches; the distance between the opposing faces of the member 58 and the wall 26, respectively, was approximately 53/64 inch; the angle of the two wall portions 23 and 26 was 37½°, the inclination being with respect to a plane parallel to the wall portion 26, and the diameter of the impellers was the same and equal to approximately 2 inches. The angles *a* and *b* (see Fig. 4) were 26° and 13° respectively. The number of blades on the impeller 32 was 13 and the number of blades on the impeller 33 was 12.

The impellers were so located within the chamber such that when interengaged they were disposed symmetrically within the same, that is, symmetrical to a plane passing transversely therethrough. The model constructed in accordance with the above dimensions automatically cut-out at speeds above 3000 R. P. M. and automatic cut-in speed was between 900 and 1100 R. P. M.

It will be appreciated that the means for interconnecting the two impellers 32 and 33 need not take the specific form shown in the drawings but may be of any type such as to cause positive rotation between such impellers when the shiftable impeller is moved into engagement with the stationary impeller. As a matter of fact, the use of two teeth for interconnecting the impellers tends to create a rather large shock load when the impellers reengage since such reengagement will occur only after the impeller 33 has reduced its speed substantially below the cut-off speed and in many instances when such speed of the impeller 33 is reached the body 10 may be rotating substantially at the cut-out speed, therefore creating a substantially large shock load upon reengagement of the two impellers. To overcome this, many equivalent devices will be readily apparent, among them being a great number of ratchet-like teeth members which are disposed in circular fashion upon the two opposing faces of the impellers 32 and 33.

With the specific construction of the positive coupling means between the two impellers 32 and 33 as shown specifically in the drawings, it is necessary to effect disengagement therebetween to momentarily neutralize the load or torque on the body member 10 so as to permit the forces acting upon the two impellers to shift the axially movable impeller 32 away from the fixed impeller 33. That is, with the specific construction shown, the flat faces of the various teeth 48, 49, 52 and 53 which effect the transmittal of torque between the two impellers 32 and 33, prevent normally any axial movement of the shiftable impeller 32 if any substantial torque is being transmitted. However, at speeds at or above the cut-out speed wherein the axial movement of the impeller 32 may occur to disengage the impeller 33, a substantial cancellation of the torque transmission between the two impellers as would be occasioned, for example, by a momentary interruption of the power drive, will permit such axial shifting of the impeller 32. It will, therefore, be evident that it is possible to overcome the cut-out effect of the drive by merely continuously applying torque to the body member 10. In this manner a driven speed of the shaft 31 far in excess of the normal cut-out speed could be obtained. However, any subsequent interruption of the drive would permit the impeller 32 to shift axially and disengage.

The cut-in speed of the impeller member 32 is, however, not affected by the application of power to the body member 10 but the reengagement or cut-in of the impeller 32 as occasioned by its axial movement toward the impeller 33, will always occur when the speed of the driven shaft 31 has reached the region of the cut-in speed.

The exact path or pattern of fluid movement within the chamber 30 while the impellers are locked together and while the same are disengaged is not precisely known, but it is known that some predetermined pattern of circulation of the fluid within the chamber 30 does occur which produces the effects above noted.

The cut-out and cut-in speeds of the assembly can be altered and varied by changing the angular dispositions of the impeller blades and is also alterable by changing the particular shape of the chamber 30. However, in all cases, it was found necessary to construct the two impellers with a dissimilar number of blades in order to produce the proper effects.

It will further be understood that this drive may be used for any purpose wherein the specific characteristics thereof are useful and it is not intended to limit this invention to any one particular use.

I claim:

1. A speed-limiting coupling comprising, a hollow driving body having a fluid-receiving chamber therein, a driven shaft projecting concentrically into said chamber and rotatable with respect to said body, first impeller means within said chamber fixed to said shaft for rotation therewith, second impeller means within said chamber journaled on said shaft and axially shiftable therealong, means constanly connecting the second impeller means with said body for rotation therewith while permitting axial shifting of said second impeller means along the drive shaft toward and away from said first impeller means, means drivingly coupling the first and second impeller means when the latter is shifted axially along the shaft toward the first impeller means, and said chamber being filled with a viscous fluid so that when the body is rotated above a predetermined speed, the second impeller will be shifted away from the first impeller to interrupt the drive from the body to the shaft.

2. In the coupling device as defined in claim 1, wherein each of said impeller means includes a central hub portion surrounding the drive shaft and a plurality of circumferentially spaced, radial blades rigid therewith, each blade being inclined with respect to a plane perpendicular to the drive shaft.

3. In the coupling device as defined in claim 1, wherein each of said impeller means includes a central hub portion surrounding the drive shaft and a plurality of circumferentially spaced, radial blades rigid therewith, each blade being inclined with respect to a plane perpendicular to the drive shaft, and there being a different number of blades on the two impeller means.

4. In the coupling device as defined in claim 1, wherein each of said impeller means includes a central hub portion surrounding the drive shaft and a plurality of circumferentially spaced, radial blades rigid therewith, each blade being inclined with respect to a plane perpendicular to the drive shaft, the angle of inclination of the blades of the first impeller means being substantially twice as great as the angle of inclination of the blades of the second impeller means.

5. In the coupling device as defined in claim 1, wherein each of said impeller means includes a central hub portion surrounding the drive shaft and a plurality of circumferentially spaced, radial blades rigid therewith, each blade being inclined with respect to a plane perpendicular to the drive shaft, and there being a different number of blades on the two impeller means, the angle of inclination of the blades of the first impeller means being substantially twice as great as the angle of inclination of the blades of the second impeller means.

6. A speed-limiting coupling device comprising a driving body having a chamber therein, the chamber being defined by a pair of spaced, circular, internal end walls, an intermediate cylindrical inner wall, and a pair of annular walls sloping toward each other and each extending between a corresponding end wall and the cylindrical wall, a driven shaft projecting into said chamber concentrically of said end walls, a first impeller means within said chamber fixed to said shaft for rotation therewith, second impeller means within said chamber journaled on said shaft and axially shiftable therealong, means constantly connecting the second impeller means with said body for rotation therewith while permitting axial shifting of said second impeller means along the drive shaft toward and away from said first impeller means, means drivingly coupling the first and second impeller means when the latter is shifted axially along the shaft toward the first impeller means, and said chamber being filled with a viscous fluid so that when the body is rotated above a predetermined speed, the second impeller will be shifted away from the first impeller to interrupt the drive from the body to the shaft.

7. In the coupling device as defined in claim 6, wherein each of said impeller means includes a central hub portion surrounding the drive shaft and a plurality of circumferentially spaced, radial blades rigid therewith, each blade being inclined with respect to a plane perpendicular to the drive shaft.

8. In the coupling device as defined in claim 6, wherein each of said impeller means includes a central hub portion surrounding the drive shaft and a plurality of circumferentially spaced, radial blades rigid therewith, each blade being inclined with respect to a plane perpendicular to the drive shaft, and there being a different number of blades on the two impeller means.

9. In the coupling device as defined in claim 6, wherein each of said impeller means includes a central hub portion surrounding the drive shaft and a plurality of circumferentially spaced, radial blades rigid therewith, each blade being inclined with respect to a plane perpendicular to the drive shaft, the angle of inclination of the blades of the first impeller means being substantially twice as great as the angle of inclination of the blades of the second impeller means.

10. In the coupling device as defined in claim 6, wherein each of said impeller means includes a central hub portion surrounding the drive shaft and a plurality of circumferentially spaced, radial blades rigid therewith, each blade being inclined with respect to a plane perpendicular to the drive shaft, and there being a different number of blades on the two impeller means, the angle of inclination of the blades of the first impeller means being substantially twice as great as the angle of inclination of the blades of the second impeller means.

References Cited in the file of this patent

UNITED STATES PATENTS 2,336,167    Dillon _____ Dec. 7, 1943

FOREIGN PATENTS 697,557    Great Britain _____ Sept. 23, 1953

OTHER REFERENCES

Flexidyne Dodge of Mishawaka, Ind. Bulletin A-640, June 1955.